US008513910B2

(12) United States Patent
Yamada

(10) Patent No.: US 8,513,910 B2
(45) Date of Patent: Aug. 20, 2013

(54) METHOD OF RETURNING POINTER TO ORIGIN POINT

(75) Inventor: Yoshihisa Yamada, Shimada (JP)

(73) Assignee: Yazaki Corporation, Tokyo (JP)

( * ) Notice: Subject to any disclaimer, the term of this patent is extended or adjusted under 35 U.S.C. 154(b) by 609 days.

(21) Appl. No.: 12/753,504

(22) Filed: Apr. 2, 2010

(65) Prior Publication Data

US 2010/0251954 A1  Oct. 7, 2010

(30) Foreign Application Priority Data

Apr. 3, 2009  (JP) .................................. 2009-091201

(51) Int. Cl.
*G05B 19/40*  (2006.01)

(52) U.S. Cl.
USPC .......................................... 318/685; 318/696

(58) Field of Classification Search
USPC .................................................. 318/685, 696
See application file for complete search history.

(56) References Cited

U.S. PATENT DOCUMENTS

| | | | |
|---|---|---|---|
| 3,946,311 A | | 3/1976 | Baker et al. |
| 4,706,008 A * | | 11/1987 | Cronch et al. ................ 318/696 |
| 4,879,510 A * | | 11/1989 | Itoh ............................... 324/150 |
| 5,287,050 A | | 2/1994 | Kronenberg et al. |
| 5,877,694 A | | 3/1999 | Kataoka |
| 6,014,075 A * | | 1/2000 | Fujimori et al. ............. 340/461 |
| 6,624,608 B2 | | 9/2003 | Komura |
| 6,657,335 B2 | | 12/2003 | Totsuka |
| 6,677,723 B2 | | 1/2004 | Shimazaki |
| 6,741,058 B2 * | | 5/2004 | Yamada et al. ............... 318/685 |
| 6,771,038 B2 * | | 8/2004 | Fyfe ............................. 318/685 |
| 6,838,982 B2 | | 1/2005 | Kondo et al. |
| 6,853,162 B2 * | | 2/2005 | Betts et al. .................... 318/696 |
| 6,956,351 B2 * | | 10/2005 | Yamada ........................ 318/685 |
| 7,145,309 B2 * | | 12/2006 | Reiter et al. .................. 318/696 |
| 2011/0100290 A1 | | 5/2011 | Nakane et al. |

FOREIGN PATENT DOCUMENTS

| | | |
|---|---|---|
| DE | 1 216 557 A | 5/1966 |
| DE | 2427720 A1 | 1/1975 |
| DE | 42 00 551 A1 | 7/1993 |
| DE | 43 10 060 C2 | 9/1993 |
| DE | 196 08 691 B4 | 9/1996 |
| DE | 196 10 059 A1 | 9/1996 |
| DE | 198 37 824 B4 | 3/2000 |

(Continued)

OTHER PUBLICATIONS

German Office Action issued Aug. 11, 2011, in corresponding German Patent Application No. 10 2010 013 634.4.

*Primary Examiner* — Rina Duda

(74) *Attorney, Agent, or Firm* — Sughrue Mion, PLLC

(57) ABSTRACT

There is provided a method of returning a pointer driven by a motor to an origin point disposed between a starting point and an endpoint of a movement range of the pointer, the method comprising the steps of: moving the pointer from an arbitrary point in the movement range to a reference point that is away from the starting point by not less than a distance between the starting point and the origin point; thereafter moving the pointer from the reference point toward the starting point; detecting the pointer by a sensor at a detection point whose relative position with respect to the origin point is known; and stopping, when the pointer at the detection point is detected, the pointer moving from the reference point toward the starting point at a predetermined point of time based on timing of the detection of the pointer at the detection point.

5 Claims, 7 Drawing Sheets

(56) References Cited

FOREIGN PATENT DOCUMENTS

| DE | 102 07 652 A1 | 9/2002 |
| DE | 103 20 359 B4 | 12/2003 |
| DE | 601 02 408 T2 | 3/2005 |
| DE | 601 25 303 T2 | 7/2007 |
| DE | 10 2007 018 523 A1 | 10/2008 |
| DE | 10 2010 038 241 A1 | 5/2011 |
| JP | 6-038593 A | 2/1994 |
| JP | 2009-042034 A | 2/2009 |

* cited by examiner

METHOD OF RETURNING POINTER TO ORIGIN POINT

BACKGROUND OF THE INVENTION

1. Technical Field

The present invention relates to a technology of moving a pointer by a driving force of a motor to cause the pointer to stop at a predetermined indicating position so as to coincide with an indicating position of the pointer in the control.

2. Background Art

For example, as the driving force of the pointer of a measuring instrument of a vehicle, a stepper motor has been being increasingly used. The stepper motor is advantageous in that the rotation amount of the pointer and the indicating position after rotation can be easily defined by the number of inputted driving pulses. However, since the control of the stepper motor is an open loop control, there are cases where the rotation amount (or rotation position) in the control and the actual rotation amount (or rotation position) are different from each other because of a loss of synchronization.

Therefore, when the pointer is driven by the stepper motor, it is necessary to perform the pointer return-to-origin-point processing as required. For the pointer return-to-origin-point processing, for example, a stopper piece is used that abuts on a stopper when the pointer indicates a measurement value of zero. This stopper piece may be provided, for example, on a gear wheel, whose rotation amount is the same as that of the pointer, in a gear train that transmits the driving force between the stepper motor and the pointer. In the pointer return-to-origin-point processing using such a stopper, a driving pulse is inputted to the stepper motor to thereby rotate the pointer from a position indicating an appropriate measurement value toward a position indicating zero, and the stopper piece is caused to abut on the stopper. Thereby, the pointer can be stopped at the zero indicating position, and the position of the pointer in the control can be reset to the zero indicating position (refer to JP-A-6-38593, for instance).

These days, forms of measuring instruments have been diversified, and among them, measuring instruments of a form that indicates a measurement value by the pointer circularly moving along the scale are emerging. This type of measurement instruments require a contrivance to move the pointer circularly. Accordingly, there has been proposed a moving mechanism that circularly moves the pointer attached to a linear member circularly arranged along the scale, by pushing the linear member in the winding direction and driving the linear member in the drawing-out direction by a stepper motor (refer to JP-A-2009-42034, for instance).

In this moving mechanism, since only the linear member has the same movement amount as that of the pointer, it is difficult to stop the pointer at the zero indicating position by using the stopper and the stopper piece like those of the conventional measuring instruments in which the pointer is rotated. In the conventional measuring instruments, when the stopper piece abuts on the stopper to stop the rotation of the pointer, the stopping of the pointer can be detected by a change of the current flowing through the coil of the stepper motor. However, in the above-described moving mechanism, since the pushing force in the winding direction is not applied to the linear member when the pointer stops at the zero indicating position, a change of the current flowing through the coil of the stepper motor does not occur, so that the stopping of the pointer cannot be detected.

Therefore, in adopting the above-described moving mechanism to measuring instruments, it is necessary to establish a new method for the pointer return-to-origin-point processing. Moreover, detecting the stopping of the pointer not by a change of the current flowing through the coil of the stepper motor is significant also in the pointer return-to-origin-point processing in various measuring instruments irrespective of the presence or absence of a structure that physically stops the pointer by the abutment of the stopper piece on the stopper.

SUMMARY OF THE INVENTION

The present invention is made in view of the above-mentioned circumstances, and an object thereof is to provide a method of returning a pointer to an origin-point capable of actually moving the pointer to a predetermined indicating position under a condition where the position of the pointer in the control can be reset to the predetermined indicating position in a measuring instrument that moves the pointer by the driving force of a motor.

In order to achieve the above object, there is provided a method of returning a pointer driven by a motor to an origin point disposed between a starting point and an endpoint of a movement range of the pointer, the method comprising the steps of: moving the pointer from an arbitrary point in the movement range to a reference point that is away from the starting point by not less than a distance between the starting point and the origin point; thereafter moving the pointer from the reference point toward the starting point; detecting, while the pointer is moving from the reference point toward the starting point, the pointer by a sensor at a detection point whose relative position with respect to the origin point is known; and stopping, when the pointer at the detection point is detected while the pointer is moving from the reference point toward the starting point, the pointer moving from the reference point toward the starting point by adjusting a driving force of the motor at a predetermined point of time based on timing of the detection of the pointer at the detection point.

According to the method of returning the pointer to the origin point as described above, when the actual pointer reaches the detection point and is detected by the sensor while the pointer is being moved from the reference point in the control toward the starting point, the position of the pointer in the control at that point of time can be set as the detection point whose relative position with respect to the origin point is known. Thereby, the position of the pointer in the control thereafter can be made to coincide with the actual position of the pointer. Consequently, both the position of the pointer in the control and the actual position of the pointer can be returned to the origin point by stopping the movement of the pointer at the predetermined point of time based on the timing of the detection of the pointer at the detection point by the sensor. The origin point may be a point where the pointer indicates the measurement amount of zero or a point where the pointer indicates a known measurement amount other than zero (including less than zero). When the actual pointer is situated at the origin point at the timing of the detection of the pointer at the detection point by the sensor, the timing of the detection of the pointer at the detection point by the sensor may be the predetermined point of time.

The method may be configured in that the step of moving the pointer from the arbitrary point in the movement range to the reference point comprises the steps of: moving the pointer from the arbitrary point in the movement range to the starting point; and thereafter moving the pointer from the starting point to the reference point, and the method may further comprises the steps of: detecting the pointer at the detection point by the sensor while the pointer is moving from the starting point toward the reference point; and stopping, when the pointer at the detection point is detected while the pointer is moving from the starting point toward the reference point, the pointer moving from the starting point toward the reference point by adjusting the driving force of the motor at a predetermined point of time based on timing of the detection of the pointer at the detection point, and in the method, when the pointer at the detection point is not detected while the pointer is moving from the starting point toward the reference point, the step of moving the pointer from the reference point toward the starting point is executed.

According to the method of returning the pointer to the origin point as mentioned above, the pointer is moved from the arbitrary point in the movement range toward the starting point in the control before the pointer is moved from the reference point in the control toward the starting point. When the actual pointer reaches the detection point and is detected by the sensor while the pointer is being moved from the given point in the movement range toward the starting point in the control, the position of the pointer in the control at that point of time can be set as the detection point whose relative position with respect to the origin point is known. Thereby, the position of the pointer in the control thereafter can be made to coincide with the actual position of the pointer. Consequently, both the position of the pointer in the control and the actual position of the pointer can be returned to the origin point by stopping the movement of the pointer at the predetermined point of time based on the timing of the detection of the pointer at the detection point by the sensor. When the actual pointer is situated at the origin point at the timing of the detection of the pointer at the detection point by the sensor, the timing of the detection of the pointer at the detection point by the sensor may be the predetermined point of time.

In order to achieve the above object, there is also provided a method of returning a pointer driven by a motor to an origin point disposed between a starting point and an endpoint of a movement range of the pointer, the method comprising the steps of: moving the pointer from an arbitrary point in the movement range to the starting point; moving the pointer from the starting point to a reference point that is away from the starting point by not less than a distance between the starting point and the origin point; detecting, while the pointer is moving from the starting point toward the reference point, the pointer by a sensor at a detection point whose relative position with respect to the origin point is known; and stopping, when the pointer at the detection point is detected by the sensor while the pointer is moving from the starting point toward the reference point, the pointer moving from the starting point toward the reference point by adjusting a driving force of the motor at a predetermined point of time based on timing of the detection of the pointer at the detection point.

According to the method of returning the pointer to the origin point as mentioned above, when the actual pointer reaches the detection point and is detected by the sensor while the pointer is being moved from the starting point in the control toward the reference point, the position of the pointer in the control at that point of time can be set as the detection point whose relative position with respect to the origin point is known. Thereby, the position of the pointer in the control thereafter can be made to coincide with the actual position of the pointer. Consequently, both the position of the pointer in the control and the actual position of the pointer can be returned to the origin point by stopping the movement of the pointer at the predetermined point of time based on the timing of the detection of the pointer at the detection point by the sensor. The origin point may be a point where the pointer indicates the measurement amount of zero or a point where the pointer indicates a known measurement amount other than zero (including less than zero). When the actual pointer is situated at the origin point at the timing of the detection of the pointer at the detection point by the sensor, the timing of the detection of the pointer at the detection point by the sensor may be the predetermined point of time.

The method may be configured in that, when the pointer at the detection point is detected by the sensor, the movement of the pointer is stopped by adjusting the driving force of the motor at timing when a predetermined time necessary for the pointer to move by a distance corresponding to the relative position of the detection point with respect to the origin point has elapsed from the detection timing.

According to the method of returning the pointer to the origin point as mentioned above, when the point of time when a time necessary for the pointer to move from the detection point to the origin point (movement time) has elapsed from the timing of the detection of the actual pointer by the sensor at the detection point while the actual pointer is moving is the predetermined point of time, both the position of the pointer in the control and the actual position of the pointer return to the origin point at the predetermined point of time. Consequently, the pointer can be accurately returned to the origin point both for the position in the control and for the actual position.

According to the method of returning the pointer to the origin point of the present invention, the pointer can be actually moved to a predetermined indicating position under a condition where the position of the pointer in the control can be reset to the predetermined indicating position irrespective of whether a structure that returns the actual pointer to the origin point by the abutment of a stopper piece on a stopper is adaptable or not.

DETAILED DESCRIPTION OF THE EXEMPLARY EMBODIMENTS

Hereinafter, an embodiment of a method of returning a pointer to an origin point according to the present invention will be described with reference to the drawings.

Figure 1:
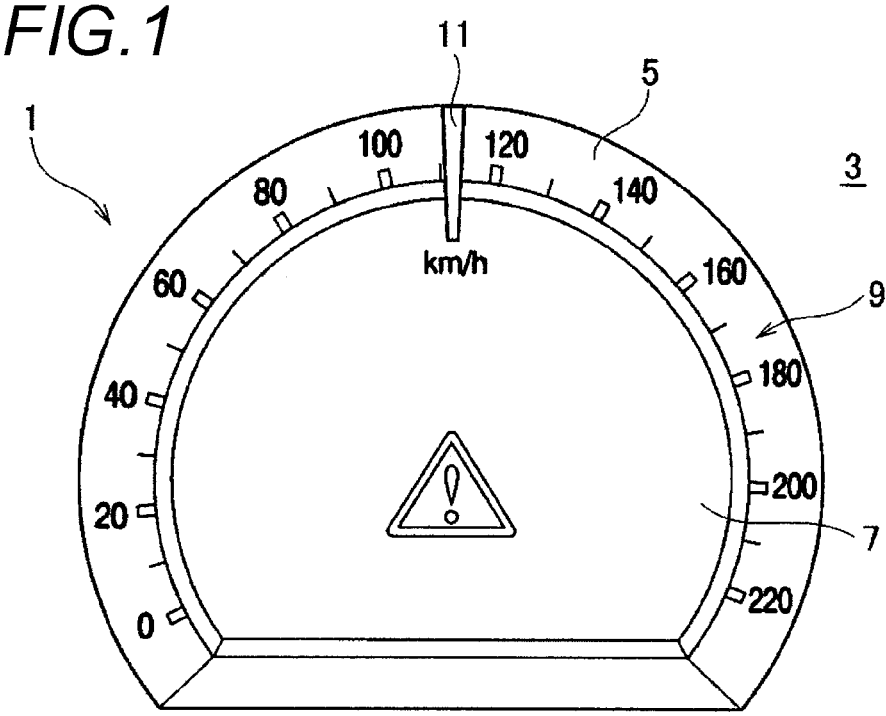
FIG. 1 is a front view of a pointer-type measuring instrument according to an embodiment of the present invention where a method of returning a pointer to the origin point is executed.
Figure 2:
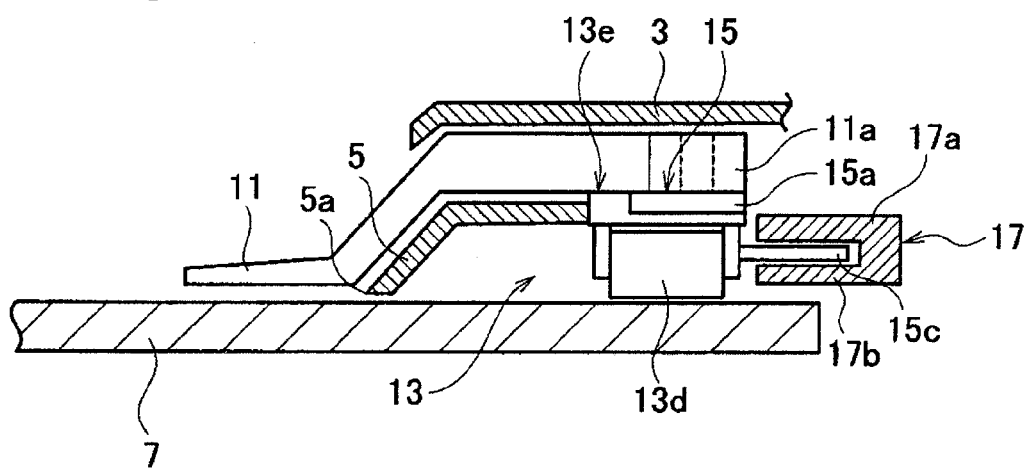
FIG. 2 is an enlarged cross-sectional view of a relevant part of the pointer-type measuring instrument shown in FIG. 1.
Figure 3:
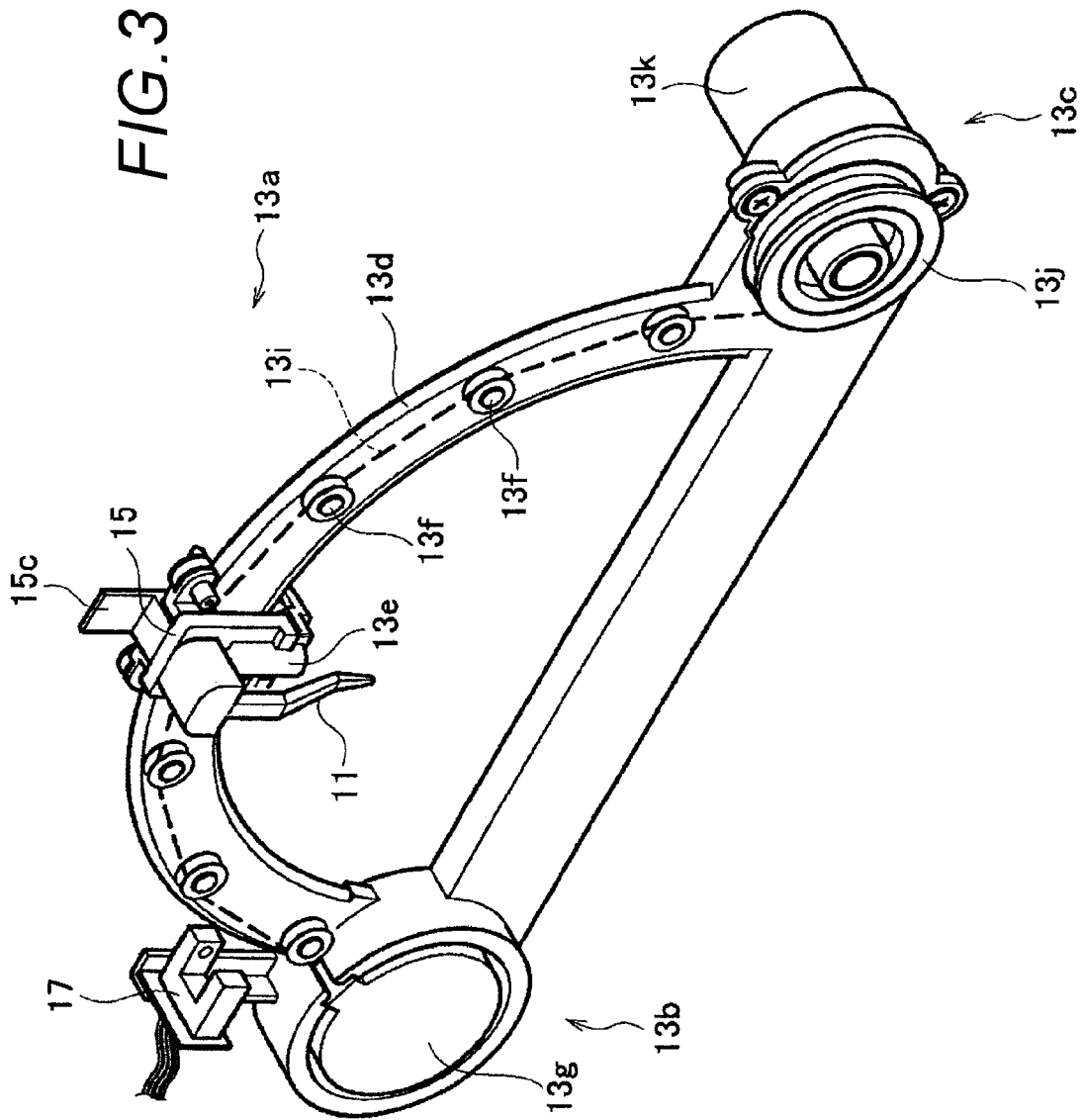
FIG. 3 is a perspective view of a pointer driving unit of the pointer-type measuring instrument shown in FIG. 1.
Figure 4:
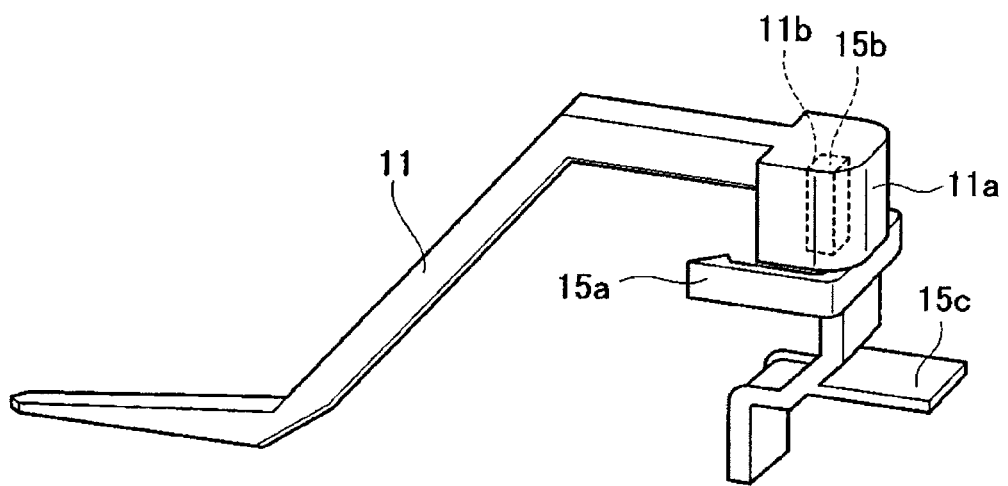
FIG. 4 is an enlarged perspective view of the pointer and a slider shown in FIG. 3.

FIG. 1 is a front view of a pointer-type measuring instrument according to an embodiment of the present invention where the method of returning a pointer to the origin point is executed. FIG. 2 is an enlarged cross-sectional view of a relevant part of the pointer-type measuring instrument shown in FIG. 1. FIG. 3 is a perspective view of a pointer driving unit of the pointer-type measuring instrument shown in FIG. 1. FIG. 4 is an enlarged perspective view of a pointer and a slider shown in FIG. 3.

In FIG. 1, a pointer-type measuring instrument 1 of the present embodiment includes: a graduated plate 5 having its periphery covered with an inside cover 3; a liquid crystal display 7 disposed behind an opening 5a in the center of the graduated plate 5; and a pointer 11 that indicates a circularly arranged scale 9 of the graduated plate 5.

As shown in FIG. 2, the pointer driving unit 13 that moves the pointer 11 along the scale 9 is disposed on the back side of the inside cover 3. As shown in FIG. 3, the pointer driving unit 13 has: an arc-shaped guide portion 13a; a drawing out mechanism 13b provided on one end side of the guide portion 13a; and a winding mechanism 13c provided on the other end side of the guide portion 13a.

The guide portion 13a has a guide rail 13d and the slider 13e. As shown in FIG. 2, the guide rail 13d is disposed along the scale 9 of the graduated plate 5 on the back side of the inside cover 3. As shown in FIG. 3, a plurality of guide pulleys 13f are attached at intervals to the side surface of the guide rail 13d opposed to the inside cover 3. The slider 13e has a guide roller that sandwiches the outer and inner surfaces of the guide rail 13d. The sandwiching of the guide rail 13d by the guide roller enables the slider 13e to reciprocate in the direction of extension of the guide rail 13d while avoiding the guide pulleys 13f on the side surface of the guide rail 13d.

The drawing out mechanism 13b has a wire case 13g. A wire 13i is drawn out from the wire case 13g. The wire 13i has appropriate tensile strength and flexibility, and can be made of, for example, an insulative material such as fiber thread or resin line. One end of the wire 13i is attached to a drawing-out side reel (not shown) accommodated in the wire case 13g. The part, on the one end side, of the wire 13i is wound around the drawing-out side reel. The drawing-out side reel is pushed in a direction in which the wire 13i is wound in the wire case 13g. For the pushing in the winding direction of the wire 13i through the drawing-out reel, for example, a spiral spring (not shown) accommodated in an accumulated condition in the wire case 13g may be used.

The winding mechanism 13c has a winding side reel 13j and a stepper motor 13k (or just referred to as a motor). The other end of the wire 13i is attached to the winding side reel 13j. The part, on the other end side, of the wire 13i is wound around the winding side reel 13j. The winding side reel 13j is attached to the output shaft of the stepper motor 13k. The stepper motor 13k is driven by the control by a microcomputer 21 described later.

The wire 13i having its both ends attached to the drawing out mechanism 13b and the winding mechanism 13c, respectively, as described above is laid along the guide pulleys 13f of the guide portion 13a between the mechanisms 13b and 13c. Moreover, the wire 13i is attached to the slider 13e between the mechanisms 13b and 13c.

It is necessary only that the cross-sectional shape of the wire 13i be one conforming to the shape of the roller surfaces of the guide pulleys 13f. Therefore, the cross-sectional shape of the wire 13i may be a circle or a rectangle. When the roller surfaces of the guide pulleys 13f have asperities for slipping prevention, the wire 13i may be made of a member such as a timing belt having corresponding asperities.

The pointer 11 is attached to the slider 13e through an attachment 15. As shown in FIG. 4, the attachment 15 has a hook 15a. The hook 15a is attached to the slider 13e of FIG. 3 and sandwiches it. The attachment 15 is also provided with an attachment pin 15b continuous with the hook 15a. The attachment pin 15b is pushed in an attachment hole 11b formed in a base portion 11a of the pointer 11. The pointer 11 is attached to the attachment 15 by pushing the attachment pin 15b in the attachment hole 11b. A light intercepting plate 15c for detecting the position of the pointer 11 is provided so as to protrude from the attachment 15. The light intercepting plate 15c is made of a nontransparent material or is colored a nontransparent color.

Therefore, when the wire 13i moves between the drawing out mechanism 13b and the winding mechanism 13c, the attachment 15 and the pointer 11 together with the slider 13e move between the drawing out mechanism 13b and the winding mechanism 13c. This movement enables the pointer 11 to indicate a given scale line of the scale 9 shown in FIG. 1. The staring point of the movement range of the pointer 11 is the position of the guide pulley 13f, closest to the drawing out mechanism 13b, on the guide rail 13d. The endpoint of the movement range of the pointer 11 is the position of the guide pulley 13f, closest to the winding mechanism 13c, on the guide rail 13d.

In the description, a normal rotation indicates a rotation from the start point to the endpoint of the movement range of the pointer 11. Further, a reverse direction indicates a rotation from the endpoint to the start point of the movement range of the pointer.

A photointerrupter 17 (or referred to as a sensor) is attached to the drawing out mechanism 13b of the pointer driving unit 13. As shown in FIG. 2, the photointerrupter 17 includes a pair of light emitting and receiving elements 17a and 17b disposed opposite to each other. When the pointer 11 is situated in a zero indicating position (or referred to as an origin point) indicating the scale line of zero of the scale 9 shown in FIG. 1, as shown in FIG. 2, the light intercepting plate 15c of the attachment 15 is situated between the light emitting element 17a and the light receiving element 17b of the photointerrupter 17. Therefore, when the pointer 11 is situated in the zero indicating position, detection light (not shown) outputted by the light emitting element 17a of the photointerrupter 17 and detected by the light receiving element 17b of the photointerrupter 17 is intercepted by the light intercepting plate 15c of the attachment 15.

Figure 5:
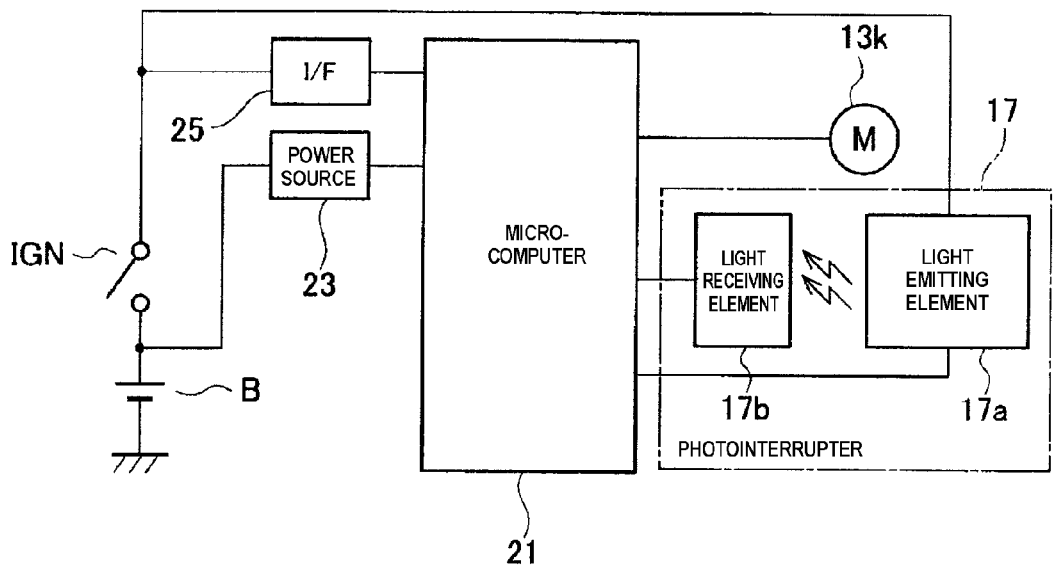
FIG. 5 is a block diagram showing the electrical structure of the pointer-type measuring instrument shown in FIG. 1.

Next, referring to the block diagram of FIG. 5, the electrical structure of the pointer-type measuring instrument 1 of the present embodiment will be described. The stepper motor 13k and the photointerrupter 17 shown in FIG. 3 are connected to the microcomputer 21.

The microcomputer 21 incorporates a ROM storing control programs and the like and a RAM used as a workspace and the like. The microcomputer 21 is supplied with stabilized power from a power source 23 connected to a battery B of a vehicle (not shown) irrespective of whether an ignition switch IGN of the vehicle is on or off. An interface (I/F) 25 is connected to the microcomputer 21 in order to detect whether the ignition switch IGN is on or off. The microcomputer 21 having detected whether the ignition switch IGN is on or off by using the interface 25 supplies power for operation to the stepper motor 13k and the photointerrupter 17 when the ignition switch IGN is on.

Figure 6:
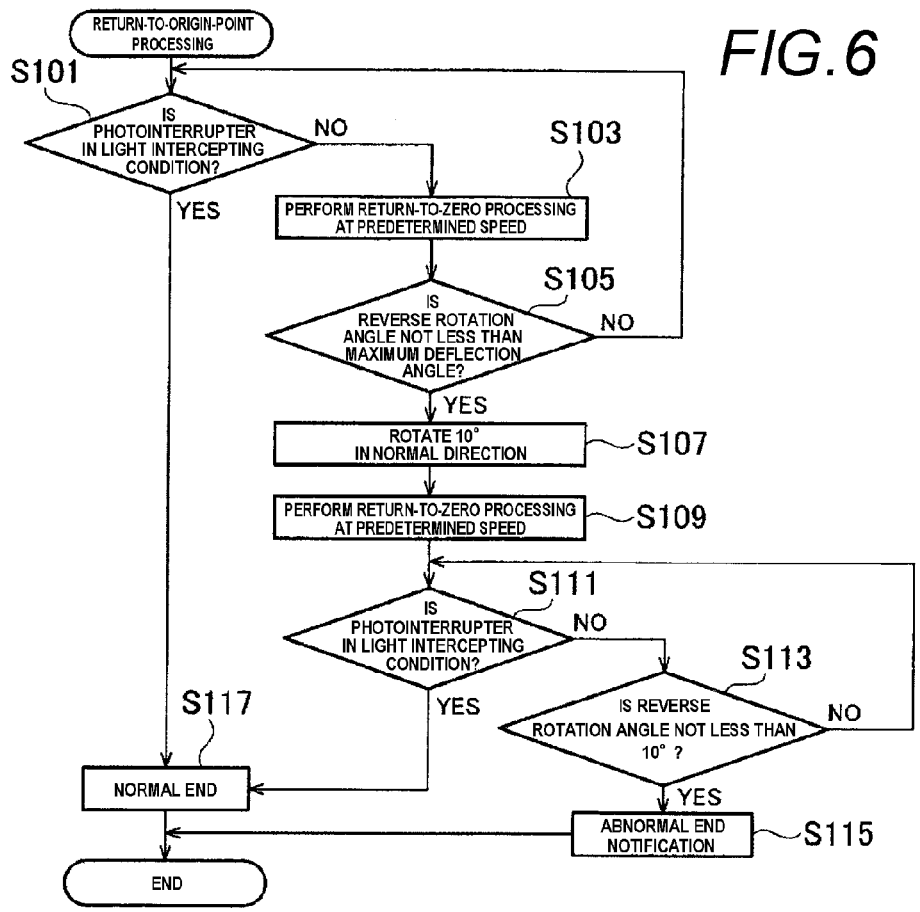
FIG. 6 is a flowchart showing return-to-origin-point processing that a microcomputer of FIG. 5 executes according to a program stored in an internal ROM.

Of the controls performed according to the control programs stored in the ROM incorporated in the microcomputer 21, the outline of the control of returning the pointer 11 to the origin point will be described with reference to the flowchart of FIG. 6. The return-to-origin-point processing of FIG. 6 is executed in a manner described below when the microcomputer 21 recognizes the occurrence of a situation that requires the return-to-origin-point processing defined by a control program stored in the ROM (the satisfaction of the condition). The processing of steps S101 to S105 described below are executed as normal return-to-origin-point processing. When the pointer 11 cannot be returned to the actual zero indicating position by the normal return-to-origin-point processing, the processing of step S107 and succeeding steps are executed as return-to-origin-point processing for an abnormal case corresponding to the method of returning a pointer to the origin point according to the present invention.

First, the microcomputer 21 checks whether the photointerrupter 17 is in the light intercepting condition or not (step S101). Whether the photointerrupter 17 is in the light intercepting condition or not can be checked based on whether the detection light is detected by the light receiving element 17b of the photointerrupter 17 or not.

When the photointerrupter 17 is in the light intercepting condition (YES at step S101), the microcomputer 21 determines that the pointer 11 is already situated in the zero indicating position, and performs normal end processing (step S117). In the normal end processing, the microcomputer 21 stops the movement of the pointer 11 by terminating the driving pulse output to the stepper motor 13k. Then, the microcomputer 21 regards the current position of the pointer 11 in the control as the zero indicating position of the pointer 11 in the control. After performing the normal end processing, the microcomputer 21 ends the return-to-origin-point processing.

On the contrary, when the photointerrupter 17 is not in the light intercepting condition (NO at step S101), in order to check the light intercepting condition of the photointerrupter 17 by bringing the pointer 11 near to the actual zero indicating position, the microcomputer 21 executes the processing of moving (returning to zero) the pointer 11 toward the zero indicating position in the control at a predetermined speed by outputting the driving pulse to the stepper motor 13k (step S103). Then, the microcomputer 21 checks whether the reverse rotation angle of the pointer 11 in the control is not less than the maximum deflection angle or not while the pointer 11 is moving (step S105). Whether the reverse rotation angle of the pointer 11 in the control is not less than the maximum deflection angle or not can be checked based on whether the movement time of the pointer 11 has reached the upper limit time or not. The upper limit time is a time required for the pointer 11 to move over the entire distance of the movement range of the guide rail 13d at the predetermined speed.

When the reverse rotation angle of the pointer 11 is less than the maximum deflection angle (NO at step S105), the process returns to step S101. When the reverse rotation angle is not less than the maximum deflection angle (YES at step S105), the microcomputer 21 determines that the position of the pointer 11 in the control has reached the starting point of the movement range. Then, the microcomputer 21 rotates the pointer 11 ten degrees in the normal direction by changing the driving pulse outputted to the stepper motor 13k (step S107). The normal rotation of the pointer 11 by ten degrees is a movement amount larger than the amount of normal rotation of the pointer 11 from the starting point of the movement range to the zero indicating position. By the normal rotation of the pointer 11 by ten degrees, the microcomputer 21 moves the position of the pointer 11 in the control from the starting point of the movement range to a reference point beyond the zero indicating position.

Then, in order to again check the light intercepting condition of the photointerrupter 17 by bringing the pointer 11 near to the actual zero indicating position, the microcomputer 21 again performs the processing of moving (returning to zero) the pointer 11 toward the zero indicating position in the control at the predetermined speed by changing the driving pulse outputted to the stepper motor 13k (step S109). Then, the microcomputer 21 checks whether the photointerrupter 17 is in the light intercepting condition or not while the pointer 11 is moving (step S111).

When the photointerrupter 17 is in the light intercepting condition (YES at step S111), the microcomputer 21 determines that the pointer 11 has reached the zero indicating position, and performs the normal end processing at step S117. When the photointerrupter 17 is not in the light intercepting condition (NO at step S111), the microcomputer 21 checks whether the reverse rotation angle of the pointer 11 in the control is not less than ten degrees or not (step S113). Whether the reverse rotation angle of the pointer 11 in the control is not less than ten degrees or not can be checked based on whether the movement time of the pointer 11 has reached a reference time or not. This reference time is a time required for the pointer 11 to move ten degrees along the guide rail 13d at the predetermined speed.

When the reverse rotation angle of the pointer 11 is less than ten degrees (NO at step S113), the process returns to step S111. When the reverse rotation angle is not less than ten degrees (YES at step S113), the microcomputer 21 determines that the actual pointer 11 cannot reach the zero indicating position, and performs abnormal end notification processing (step S115). In the abnormal end notification processing, the microcomputer 21 stops the movement of the pointer 11 by terminating the driving pulse output to the stepper motor 13k. Then, the microcomputer 21 executes an abnormal end notification operation. The abnormal end notification operation is, for example, the display of an attention mark shown in FIG. 1 on the liquid crystal display 7 or the output of a diagnosis signal representative of a position abnormality of the pointer 11, to an ECU (not shown) of the vehicle to which the microcomputer 21 is connected. It is to be noted that the abnormal end notification operation may be an operation other than these. After performing the abnormal end notification processing, the microcomputer 21 ends the return-to-origin processing.

As described above, according to the pointer-type measuring instrument 1 of the present embodiment, when the actual pointer 11 does not reach the zero indicating position in the normal return-to-origin-point processing (steps S101 to S105 of FIG. 6), the return-to-origin-point processing for an abnormal case (steps S107 to S117 of FIG. 6) is executed. Then, in the return-to-origin-point processing for an abnormal case, whether the actual pointer 11 is situated in the zero indicating position or not is detected by the photointerrupter 17 while the pointer 11 is being moved from the reference point toward the starting point of the movement range in the control. When it is determined that the actual pointer 11 is situated in the zero indicating position while the pointer 11 is moving, the pointer 11 is stopped at the position, and the zero indicating position of the pointer 11 in the control is rendered the current position of the pointer 11 in the control.

Consequently, the pointer 11 can be actually moved to the zero indicating position under a condition where the position of the pointer 11 in the control can be reset to the zero indicating position in the return-to-origin-point processing for an abnormal case even though the pointer driving unit 13 with which it is difficult to mechanically stop the movement of the pointer 11 at the zero indicating position by causing a stopper piece to abut on a stopper is used for moving the pointer 11.

(Modification 1)

In the present embodiment, in performing the return-to-origin-point processing for an abnormal case, whether the actual pointer 11 has reached the zero indicating position or not is checked while the position of the pointer 11 in the control is being moved toward the starting point from the reference point, beyond the zero indicating position, normally rotated ten degrees from the starting point of the movement range. However, in the return-to-origin-point processing for an abnormal case, whether the actual pointer 11 has reached the zero indicating position or not may be checked while the position of the pointer 11 in the control is being normally rotated ten degrees from the starting point of the movement range to the reference point beyond the zero indicating position.

A pointer-type measuring instrument 1 according to a modification of the present invention has such a structure. The microcomputer 21 of the pointer-type measuring instrument 1 according to this modification performs the processing shown in the flowchart of FIG. 7 according to a control program stored in the ROM. Of this, the processing of steps S101 to S105 are the same as those of steps S101 to S105 shown in the flowchart of FIG. 6.

When the reverse rotation angle of the pointer 11 is not less than the maximum deflection angle at step S105 (YES), the microcomputer 21 of the present modification determines that the position of the pointer 11 in the control has reached the starting point of the movement range. Then, in order to check the light intercepting condition of the photointerrupter 17 by bringing the pointer 11 near to the actual zero indicating position, the microcomputer 21 executes the processing of moving (normally rotating) the pointer 11 toward the zero indicating position in the control at a predetermined speed by changing the driving pulse outputted to the stepper motor 13$k$ (step S107A). Then, the microcomputer 21 checks whether the photointerrupter 17 is in the light intercepting condition or not while the pointer 11 is moving (step S111).

When the photointerrupter 17 is in the light intercepting condition (YES at step S111), the microcomputer 21 determines that the pointer 11 has reached the zero indicating position, and performs the normal end processing at step S117. When the photointerrupter 17 is not in the light intercepting condition (NO at step S111), the microcomputer 21 checks whether the normal rotation angle of the pointer 11 in the control is not less than ten degrees or not (step S113A). Whether the normal rotation angle of the pointer 11 in the control is not less than ten degrees or not can be checked based on whether the movement time of the pointer 11 has reached the reference time or not.

When the normal rotation angle of the pointer 11 is less than ten degrees (NO at step S113A), the process returns to step S111. When the normal rotation angle is not less than ten degrees (YES at step S113A), the microcomputer 21 determines that the actual pointer 11 cannot reach the zero indicating position, and performs the abnormal end notification processing (step S115). After performing the abnormal end notification processing, the microcomputer 21 ends the return-to-origin processing.

With the pointer-type measuring instrument 1 according to the modification structured as described above, similar effects to those of the pointer-type measuring instrument 1 of the above-described embodiment can be obtained.

(Modification 2)

Figure 7:
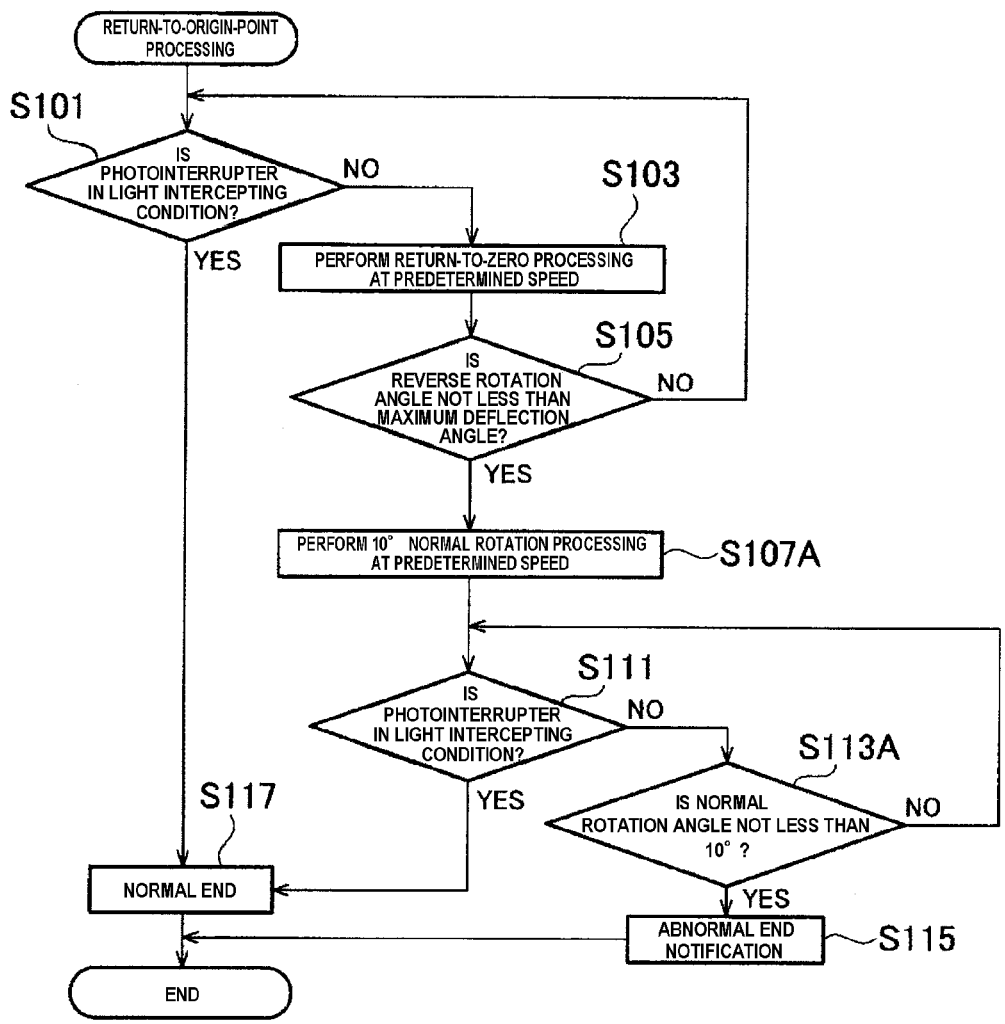
FIG. 7 is a flowchart showing a first modification of the return-to-origin-point processing that the microcomputer of FIG. 5 executes according to a program stored in the internal ROM.

Further, in the return-to-origin-point processing for an abnormal case, the processing performed at steps S107A, S111 and S113A of the flowchart of FIG. 7 may be executed while the pointer 11 in the control is normally rotated ten degrees from the starting point of the movement area at step S107 of the flowchart of FIG. 6.

A pointer-type measuring instrument 1 according to a second modification of the present invention has such a structure. The microcomputer 21 of the pointer-type measuring instrument 1 according to the second modification performs the processing shown in the flowchart of FIG. 8 according to a control program stored in the ROM. Of this, the processing of steps S101 to S105 are the same as those of steps S101 to S105 shown in the flowcharts of FIGS. 6 and 7.

Figure 8:
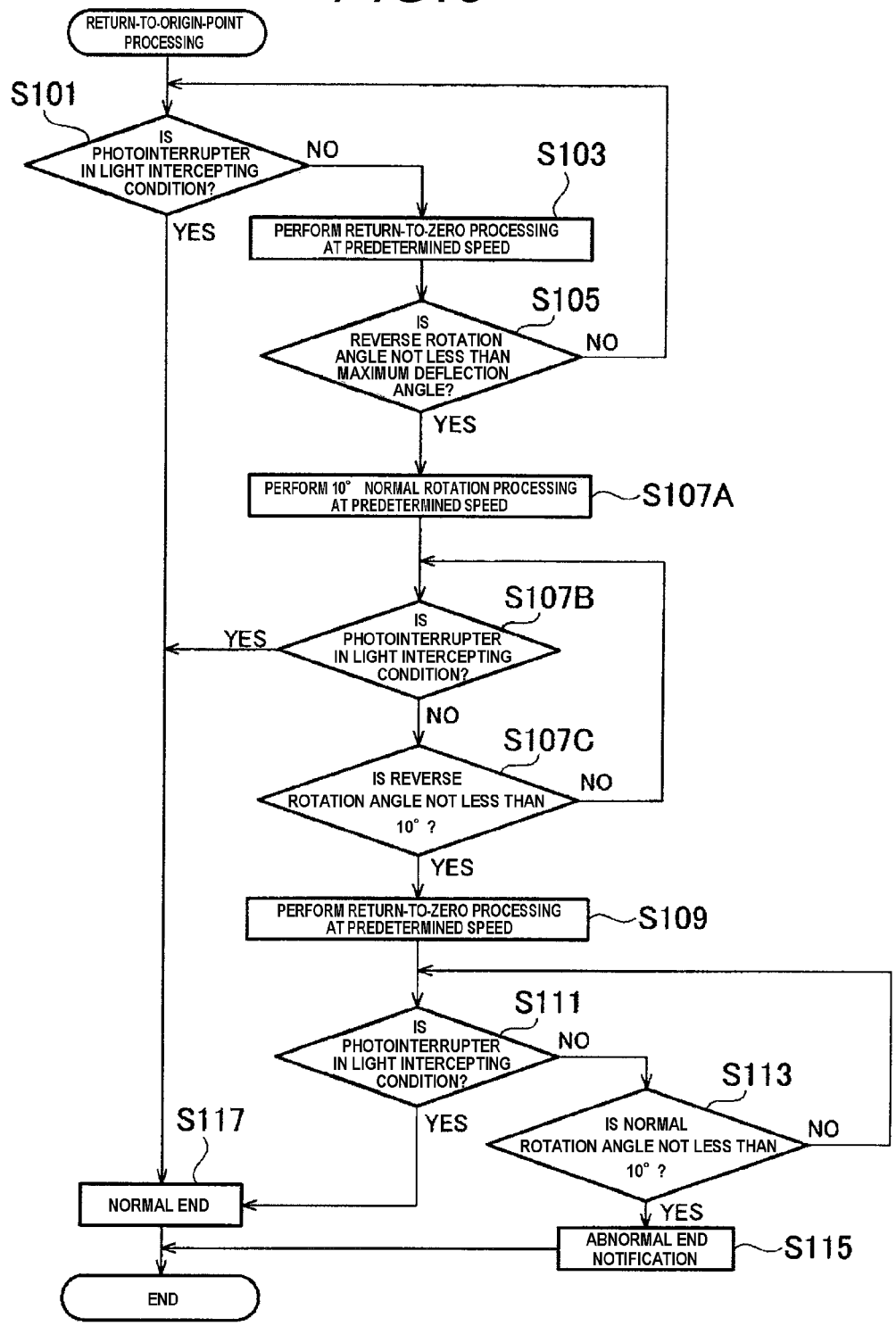
FIG. 8 is a flowchart showing a second modification of the return-to-origin-point processing that the microcomputer of FIG. 5 executes according to a program stored in the internal ROM.

When the reverse rotation angle of the pointer 11 is not less than the maximum deflection angle at step S105 (YES at step S105), the microcomputer 21 of the present modification performs the processing performed at steps S107A, S111 and S113A of the flowchart of FIG. 7 as steps S107A, S107B and S107C shown in FIG. 8, respectively.

That is, when the reverse rotation angle of the pointer 11 is not less than the maximum deflection angle at step S105 (YES), the microcomputer 21 determines that the position of the pointer 11 in the control has reached the starting point of the movement range. Then, in order to check the light intercepting condition of the photointerrupter 17 by bringing the pointer 11 near to the actual zero indicating position, the microcomputer 21 executes the processing of moving (normally rotating) the pointer 11 toward the zero indicating position in the control at a predetermined speed by changing the driving pulse outputted to the stepper motor 13$k$ (step S107A). Then, the microcomputer 21 checks whether the photointerrupter 17 is in the light intercepting condition or not while the pointer 11 is moving (step S107B).

When the photointerrupter 17 is in the light intercepting condition (YES at step S107B), the microcomputer 21 determines that the pointer 11 has reached the zero indicating position, and performs the normal end processing at step S117. When the photointerrupter 17 is not in the light intercepting condition (NO at step S107B), the microcomputer 21 checks whether the normal rotation angle of the pointer 11 in the control is not less than ten degrees or not (step S107C). Whether the normal rotation angle of the pointer 11 in the control is not less than ten degrees or not can be checked based on whether the movement time of the pointer 11 has reached the reference time or not.

When the normal rotation angle of the pointer 11 is less than ten degrees (NO at step S107C), the process returns to step S107B. When the normal rotation angle is not less than ten degrees (YES at step S107C), the microcomputer 21 determines that the actual pointer 11 cannot reach the zero indicating position, and performs the processing of steps S109 and succeeding steps of the flowchart of FIG. 6.

With the pointer-type measuring instrument 1 according to the second modification structured as described above, similar effects to those of the pointer-type measuring instrument 1 of the above-described embodiment can be obtained.

In the pointer-type measuring instruments 1 according to the above-described embodiment and the modifications thereof, when the actual pointer 11 is situated in the zero indicating position, the light intercepting plate 15$c$ is situated between the light emitting element 17$a$ and the light receiving element 17b of the photointerrupter 17, and the detection light (not shown) of the photointerrupter 17 is intercepted by the light intercepting plate 15c. Consequently, the timing when the actual pointer 11 which is moving reaches the strict zero indicating position coincides with the timing when the detection light (not shown) of the photointerrupter 17 is intercepted by the light intercepting plate 15c.

However, the attachment position of the photointerrupter 17 may be a position where the detection light (not shown) of the photointerrupter 17 is intercepted by the light intercepting plate 15c before the actual pointer 11 reaches the zero indicating position. In that case, the contents of the normal end processing of step S117 of the flowcharts of FIGS. 6, 7 and 8 are slightly changed. Specifically, in the normal end processing, the timing when the movement of the pointer 11 is stopped by terminating the output of the driving pulse to the stepper motor 13k is delayed by a predetermined time required for the actual pointer 11 to move from the detection point detected by the photointerrupter 17 to the zero indicating position.

Figure 9:
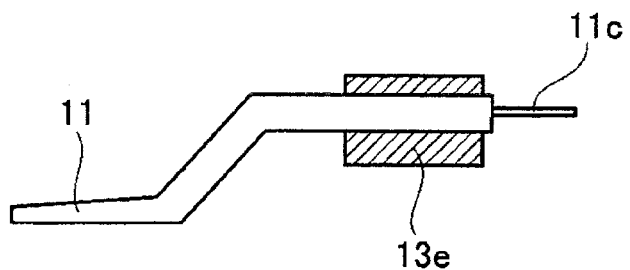
FIG. 9 is an enlarged cross-sectional view showing a first modification of a relevant part of the pointer-type measuring instrument shown in FIG. 1.
Figure 10:
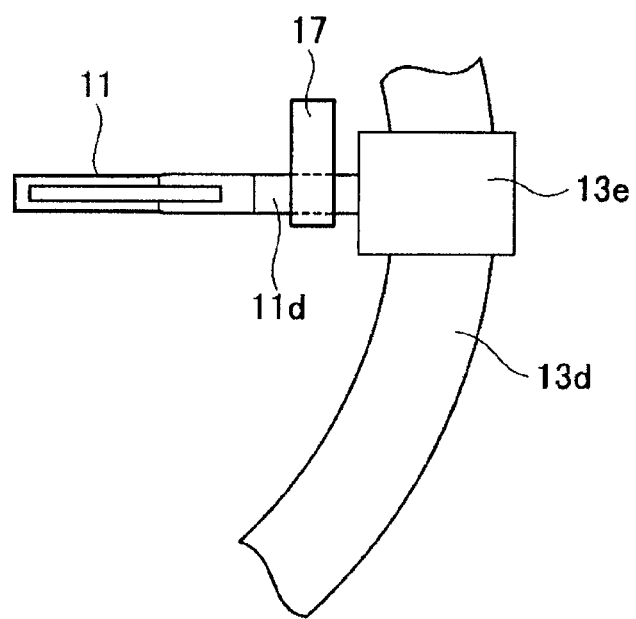
FIG. 10 is an enlarged cross-sectional view showing a second modification of a relevant part of the pointer-type measuring instrument shown in FIG. 1.

While in the above-described embodiment and the modifications thereof, the light intercepting plate 15c that intercepts the detection light of the photointerrupter 17 is provided on the attachment 15, a structure as shown in FIG. 9 may be adopted in which the base portion of the pointer 11 is directly attached to the slider 13e and a light intercepting plate 11c is directly provided on the base portion of the pointer 11. Alternatively, a structure as shown in FIG. 10 may be adopted in which the base portion of the pointer 11 is used as a light intercepting portion 11d. In that case, the light intercepting plate 11c and the light intercepting portion 11d are made of a nontransparent material or are colored a nontransparent color.

While in the above-described embodiment and the modifications thereof, the position where the actual pointer 11 is detected by the photointerrupter 17 through the light intercepting plate 11c or 15c or the light intercepting portion 11d is the zero indicating position, the position where the actual pointer 11 is detected by the photointerrupter 17 is not limited to the zero indicating position but is arbitrary. Instead of the zero indicating position, any known position such as a position indicating 20 km/h on the scale 9 or a position indicating a negative value on the scale 9 lower than 0 km/h may be the position where the actual pointer 11 is detected by the photointerrupter 17.

In a case where a predetermined known position other than the zero indicating position is the position where the actual pointer 11 is detected by the photointerrupter 17, when the photointerrupter 17 detects the light intercepting plate 11c or 15c or the light intercepting portion 11d, by resetting the position of the pointer 11 in the control to a predetermined position, for example, thereafter, the pointer 11 can be returned to the zero indicating position by the driving force of the stepper motor 13k by the control by the microcomputer 21.

While in the above-described embodiment and the modifications thereof, the photointerrupter 17 that detects the light intercepting plate 15c of the attachment 15, the light intercepting plate 11c of the pointer 11 or the light intercepting portion 11d of the pointer 11 is used as the sensor that detects that the actual pointer 11 is situated in a predetermined position such as the zero indicating position, a different structure may be used as the sensor. For example, a sensor that detects, in a non-contact manner, the actual pointer 11 situated in the zero indicating position such as a Hall element or a light reflecting sensor that detects the magnetic force on the pointer 11 side may be used instead of the photointerrupter 17.

While in the above-described embodiment and the modifications thereof, a case where the driving source of the pointer 11 is the stepper motor 13k is described as an example, the present invention is also applicable to a case where a motor other than the stepper motor is the driving source of the pointer 11. Likewise, in the above-described embodiment and the modifications thereof, the pointer-type measuring instrument 1 that moves the pointer 11 attached to the wire 13i (linear member) by adjusting the driving force in the drawing-out direction opposite to the winding direction which driving force is applied from the stepper motor 13k to the wire 13i pushed in the winding direction by the pointer driving unit 13 is described as an example. However, the present invention is widely applicable to pointer-type measuring instruments that move (rotate) the pointer with the driving force of a motor.

While in the above-described embodiment and the modifications thereof, the pointer-type measuring instruments 1 mounted in vehicles are described as an example. However, the present invention is widely applicable to pointer-type measuring instruments used in other than vehicles. It is to be noted that the present invention may be carried out not only in pointer-type measuring instruments with which it is difficult to mechanically stop the movement of the pointer at a predetermined indicating position by causing a stopper piece to abut on a stopper but also in pointer-type measuring instruments where it is possible to mechanically stop the pointer at a predetermined indicating position.

While in the above-described embodiment and the modifications thereof, the value of the normal rotation angle and the reverse rotation angle used in each step of the return-to-origin-point processing is 10°, the value is not limited thereto. The value of the normal rotation angle and the reverse rotation angle can be arbitrarily set depending on the situation such as a size of the pointer-type measuring instrument, the control method of the microcomputer, etc.

The present invention is suitable for use to cause the pointer to stop at a predetermined indicating position so as to coincide with an indicating position of the pointer in the control.

What is claimed is:

1. A method of returning a pointer driven by a motor to an origin point disposed between a starting point and an end-point of a movement range of the pointer, the method comprising the steps of:

moving the pointer from an arbitrary point in the movement range to a reference point, wherein the reference point is away from the starting point by not less than a distance between the starting point and the origin point; thereafter moving the pointer from the reference point toward the starting point;

detecting while the pointer is moving from the reference point toward the starting point, the pointer by a sensor at a detection point whose relative position with respect to the origin point is known; and stopping, when the pointer at the detection point is detected while the pointer is moving from the reference point toward the starting point, the pointer moving from the reference point toward the starting point by adjusting a driving force of the motor at a predetermined point of time based on timing of the detection of the pointer at the detection point.

2. The method according to claim 1, wherein the step of moving the pointer from the arbitrary point in the movement range to the reference point comprises the steps of:

moving the pointer from the arbitrary point in the movement range to the starting point; and thereafter moving the pointer from the starting point to the reference point, wherein the method further comprises the steps of:

detecting the pointer at the detection point by the sensor while the pointer is moving from the starting point toward the reference point; and stopping, when the pointer at the detection point is detected while the pointer is moving from the starting point toward the reference point, the pointer moving from the starting point toward the reference point by adjusting the driving force of the motor at a predetermined point of time based on timing of the detection of the pointer at the detection point, and wherein when the pointer at the detection point is not detected while the pointer is moving from the starting point toward the reference point, the step of moving the pointer from the reference point toward the starting point is executed.

3. The method according to claim 1, wherein when the pointer at the detection point is detected by the sensor, the movement of the pointer is stopped by adjusting the driving force of the motor at timing when a predetermined time necessary for the pointer to move by a distance corresponding to the relative position of the detection point with respect to the origin point has elapsed from the detection timing.

4. A method of returning a pointer driven by a motor to an origin point disposed between a starting point and an endpoint of a movement range of the pointer, the method comprising the steps of:

moving the pointer from an arbitrary point in the movement range to the starting point;

moving the pointer from the starting point to a reference point, wherein the reference point is away from the starting point by not less than a distance between the starting point and the origin point;

detecting, while the pointer is moving from the starting point toward the reference point, the pointer by a sensor at a detection point whose relative position with respect to the origin point is known; and stopping, when the pointer at the detection point is detected by the sensor while the pointer is moving from the starting point toward the reference point, the pointer moving from the starting point toward the reference point by adjusting a driving force of the motor at a predetermined point of time based on timing of the detection of the pointer at the detection point.

5. The method according to claim 4, wherein when the pointer at the detection point is detected by the sensor, the movement of the pointer is stopped by adjusting the driving force of the motor at timing when a predetermined time necessary for the pointer to move by a distance corresponding to the relative position of the detection point with respect to the origin point has elapsed from the detection timing.

\* \* \* \* \*